Aug. 20, 1957    D. T. DOBROGOWSKI ET AL    2,803,465
AUTOMATIC PHONOGRAPH WITH NOVEL TONE ARM CONTROL
Filed Sept. 7, 1951                  6 Sheets-Sheet 1
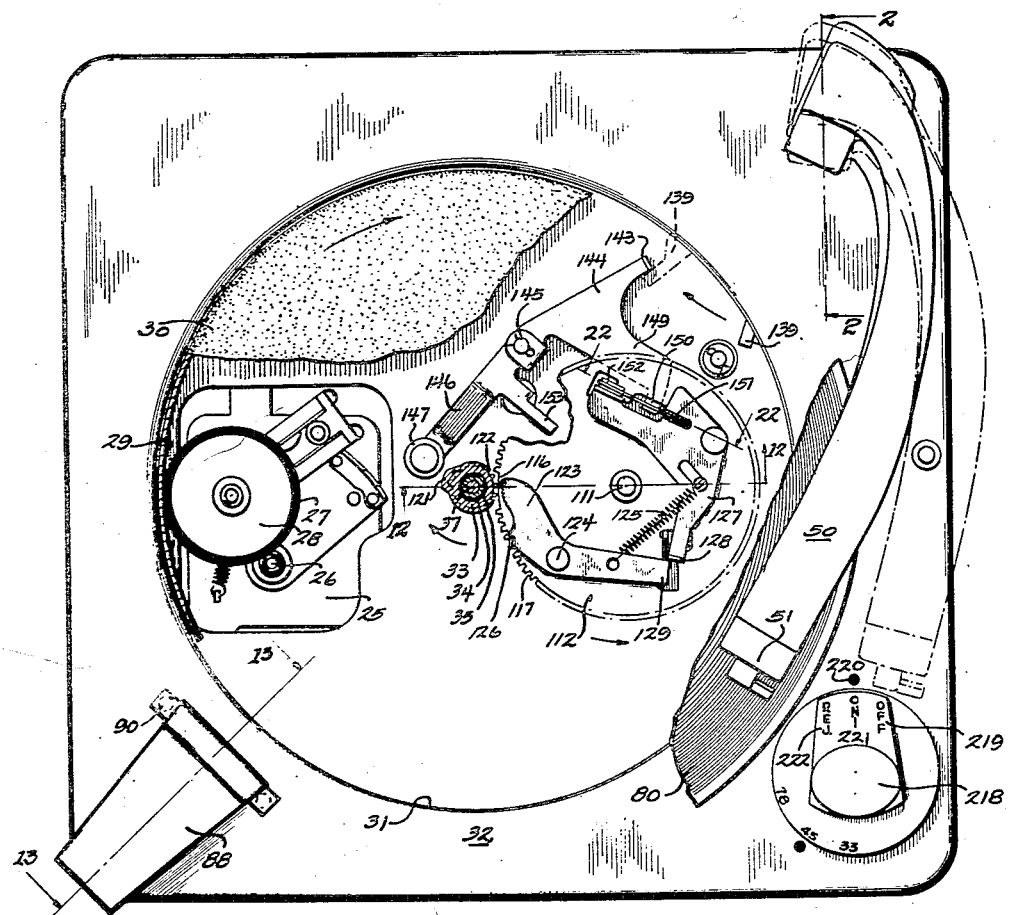
Fig. 1
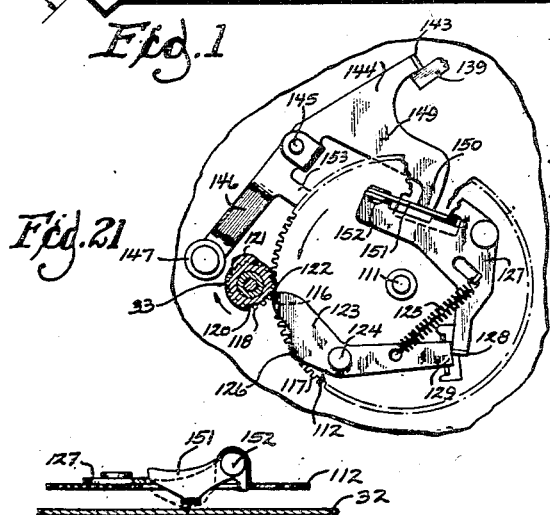
Fig. 21
Fig. 22
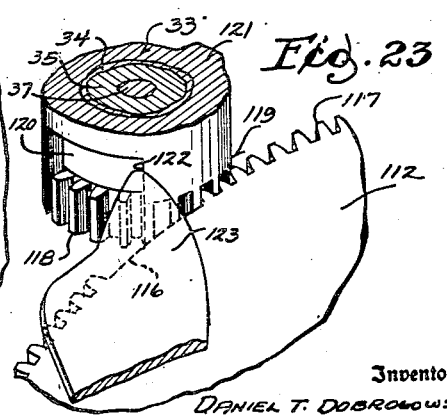
Fig. 23
Inventors
DANIEL T. DOBROGOWSKI
RALPH M. ROEN
ROBERT H. JONES
Wheeler, Wheeler & Wheeler
Attorneys

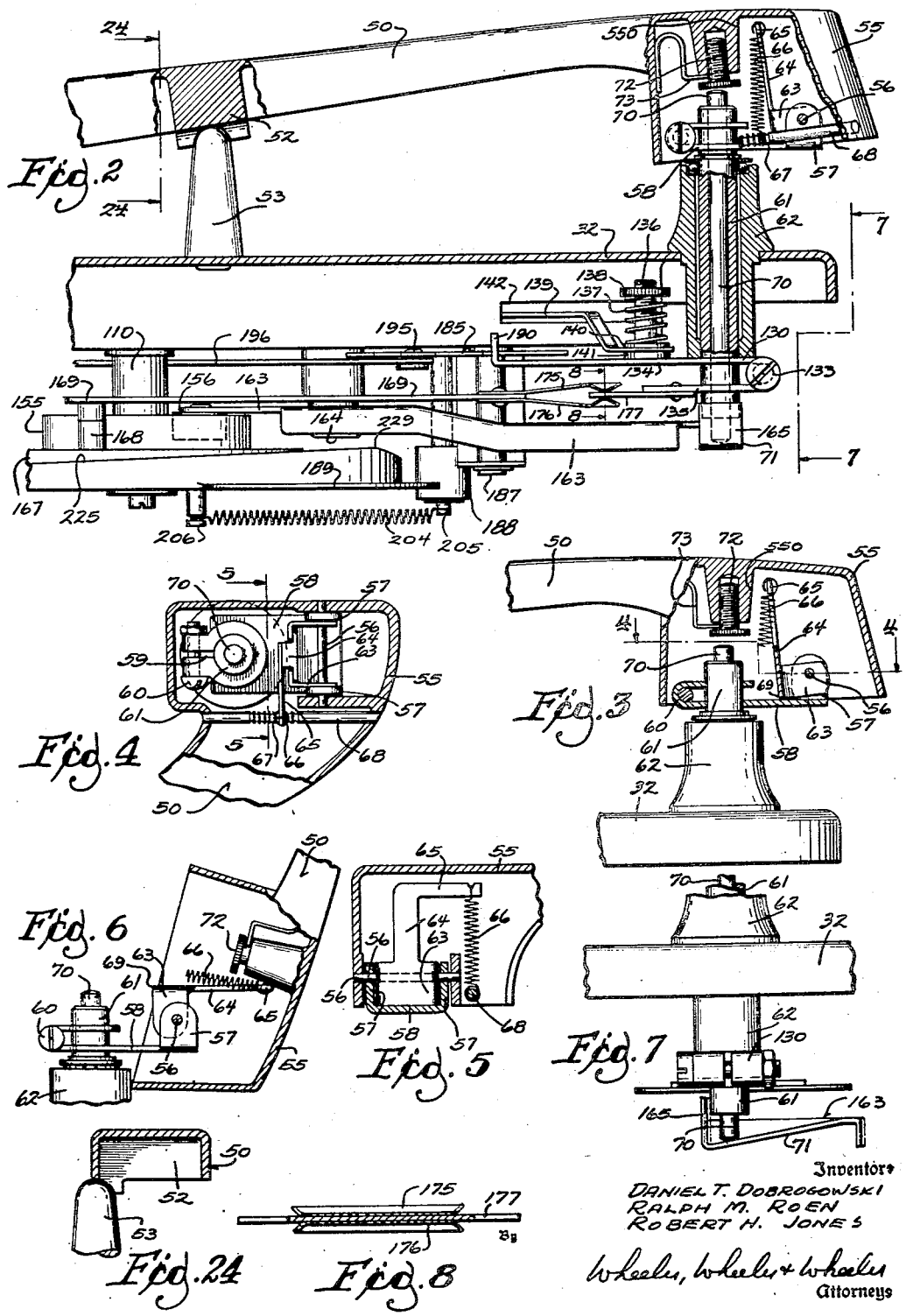

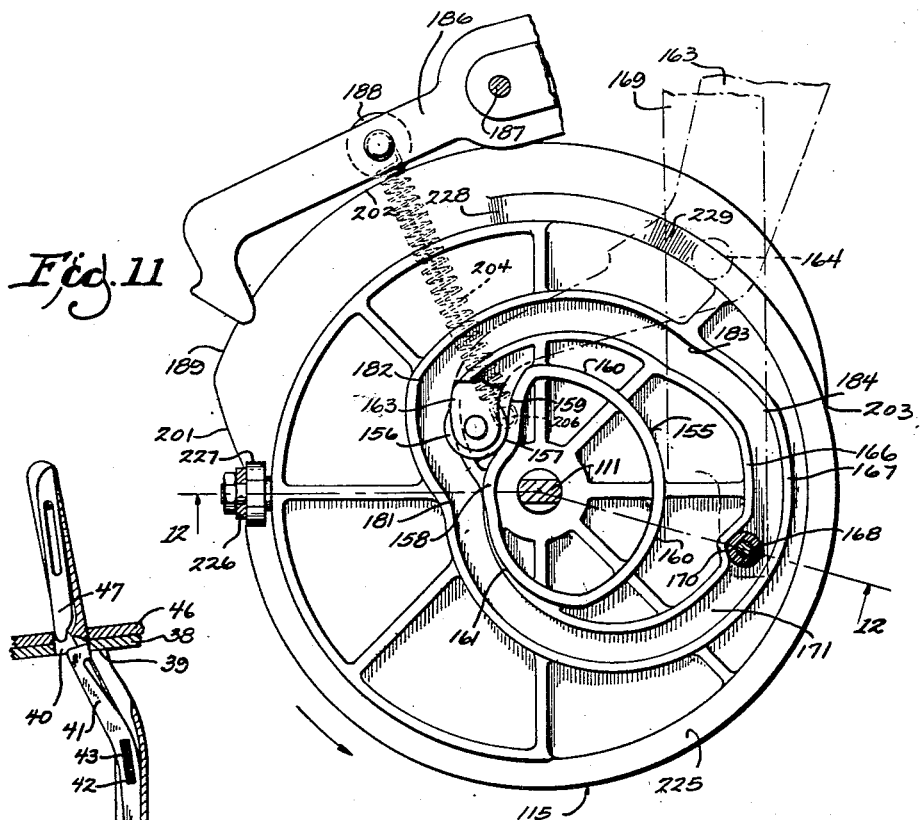
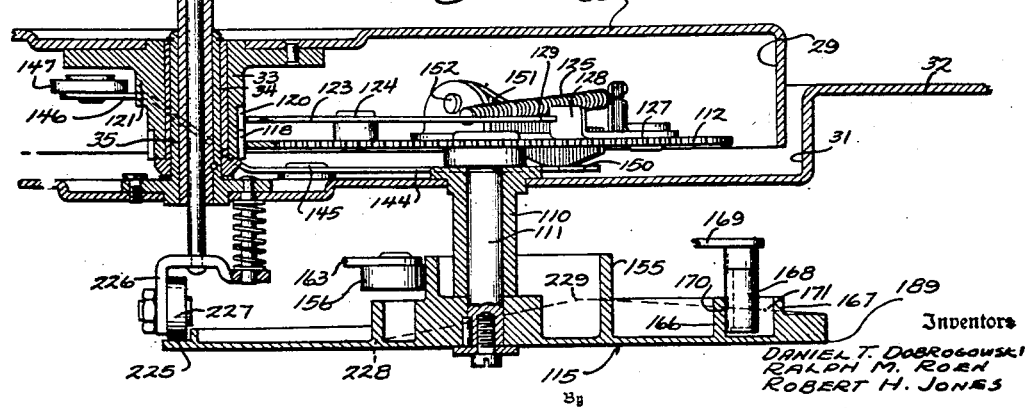

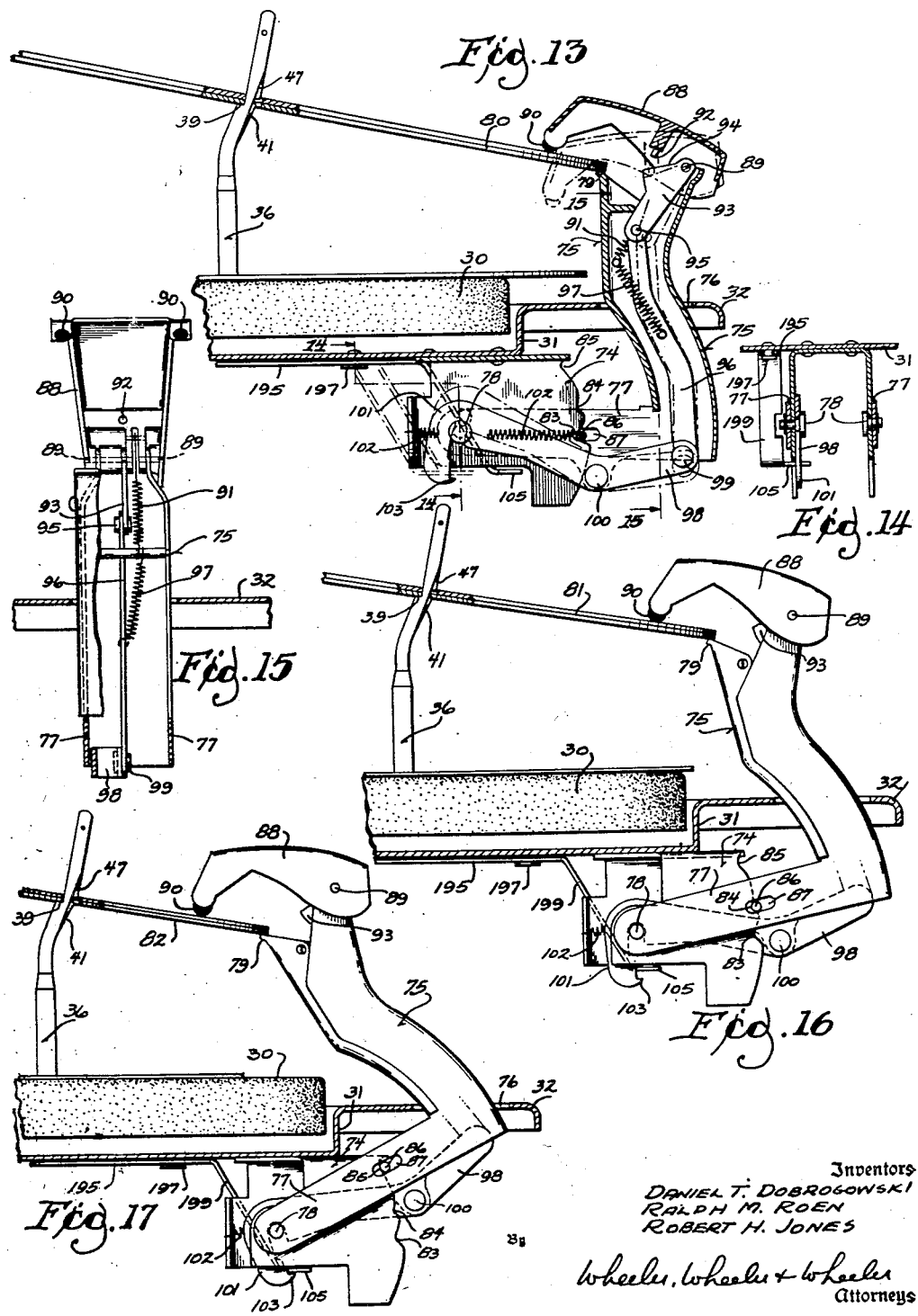

Aug. 20, 1957   D. T. DOBROGOWSKI ET AL   2,803,465
AUTOMATIC PHONOGRAPH WITH NOVEL TONE ARM CONTROL
Filed Sept. 7, 1951   6 Sheets-Sheet 6
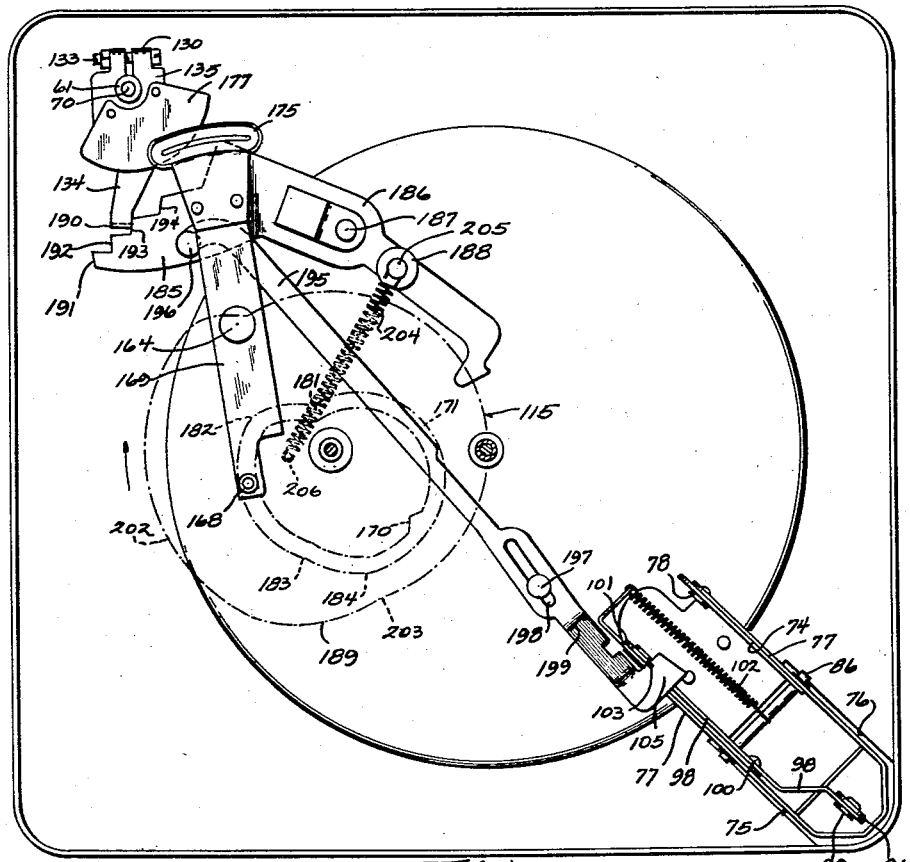
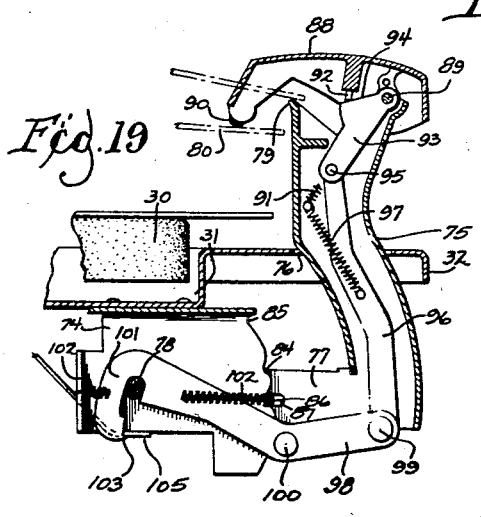
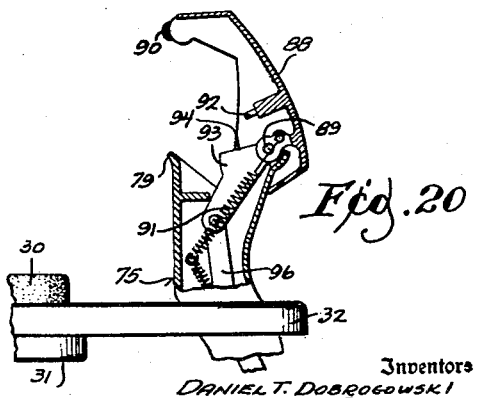
Inventors
DANIEL T. DOBROGOWSKI
RALPH M. ROEN
ROBERT H. JONES
By
Wheeler, Wheeler + Wheeler
Attorneys United States Patent Office 2,803,465
Patented Aug. 20, 1957

2,803,465

AUTOMATIC PHONOGRAPH WITH NOVEL TONE ARM CONTROL

Daniel T. Dobrogowski, Milwaukee, Ralph M. Roen, Greenfield, and Robert H. Jones, West Allis, Wis., assignors to Milwaukee Stamping Company, Milwaukee, Wis., a corporation of Wisconsin Application September 7, 1951, Serial No. 245,536

4 Claims. (Cl. 274—10)

This invention relates to an automatic phonograph with novel tone arm control and other features.

The tone arm control involves an arrangement whereby the multiple cam which actuates all of the record changing functions of the machine will rotate 360° and then stop at the conclusion of its cycle, to be re-activated when a velocity trip mechanism functions at the conclusion of the record playing operation. The operation of the mechanism controlled by the cam is made to vary according to the adjustment of the record supporting shelf so that, according to the diameter of the record for which the shelf is adjusted, the cam controlled mechanism will automatically stop movement of the tone arm toward playing position to register the stylus with the outermost groove of the record. There is further a provision for shutting off the machine when the last record has been played and this is controlled by the follower for the shelf, which drops when the last record is discharged from the shelf. There is, however, means for deferring the shut off until that record has been reproduced.

A further feature of the invention is to control the angular tone arm position during the retraction of the stop so that except as engaged by a record groove the stylus will not swing from the angular position to which it has automatically been adjusted according to the size of the record.

A further feature of the invention is the counterbalancing spring for the tone arm which is effective throughout comparatively small vertical range of tone arm travel and adjustable to provide the requisite counterbalance during record reproduction, but which neither precludes the lifting of the tone arm out of this range, nor loses its tension when the tone arm is so lifted. Moreover the moment of the spring is varied inversely to its loading.

The present application is a companion to our co-pending applications as follows: Serial No. 105,864, filed July 20, 1949, Automatic Record Changer for Various Record Sizes; Serial No. 191,682, filed October 23, 1950, Automatic Record Changer for Various Record Sizes; Serial No. 232,094, filed June 18, 1951, Escapement Mechanism for Record Players. Application Serial No. 232,094 above identified pertains to the identical escapement mechanism incorporated in the spindle of the present case.

In the drawings:

Fig. 1 is a plan view of the reproducer as it appears when playing a twelve inch record, most of the record and a large part of the turn table being broken away to expose the underlying structure.

Fig. 2 is a view taken in section on the line 2—2 of Fig. 1.

Fig. 3 is a fragmentary detail view through a portion of the tone arm showing the latter in playing position.

Fig. 4 is a view taken in section on the line 4—4 of Fig. 3.

Fig. 5 is a view taken in section on the line 5—5 of Fig. 4.

Fig. 6 is a view similar to Fig. 3 showing the tone arm raised to the limit of its pivotal upward movement.

Fig. 7 is a view taken on the line 7—7 of Fig. 2.

Fig. 8 is a view taken in section on line 8—8 of Fig. 2.

Fig. 11 is a diagrammatic view in horizontal section showing the multiple control cam in plan.

Fig. 12 is a view taken in section on the line 12—12 of Fig. 11.

Fig. 13 is a view taken in section on the line 13—13 of Fig. 1.

Fig. 14 is a view taken in section on the line 14—14 of Fig. 13.

Fig. 15 is a view taken in section on the line 15—15 of Fig. 13, with portions of the record support shelf arm shown in full.

Fig. 16 is a view in section through the base plate similar to that of Fig. 13, the record support shelf arm being shown in full and in a position for playing a ten inch record.

Fig. 17 is a view similar to Fig. 16 showing the shelf and arm in position for playing a seven inch record.

Fig. 18 is an inverted plan view diagrammatically illustrating the connection between the step cam and the record support shelf arm.

Fig. 19 is a view similar to Fig. 13 showing the record follower in the position which it assumes upon discharge of the last record from the shelf.

Fig. 20 is a view similar to Fig. 19 showing the record follower raised to receive a fresh stack of records.

Fig. 21 is a detailed view fragmentarily illustrating a portion of the parts shown in Fig. 1 as they appear when the velocity trip acts to position the dog for initiating cam movement.

Fig. 22 is a fragmentary detail view taken on the line 22—22 of Fig. 21 and illustrating the re-cocking of the trip.

Fig. 23 is an enlarged detail view in perspective showing how the trip-control dog functions to initiate movement of the multiple control cam.

Fig. 24 is a detail view taken in section on the line 24—24 of Fig. 2.

Figure 9:
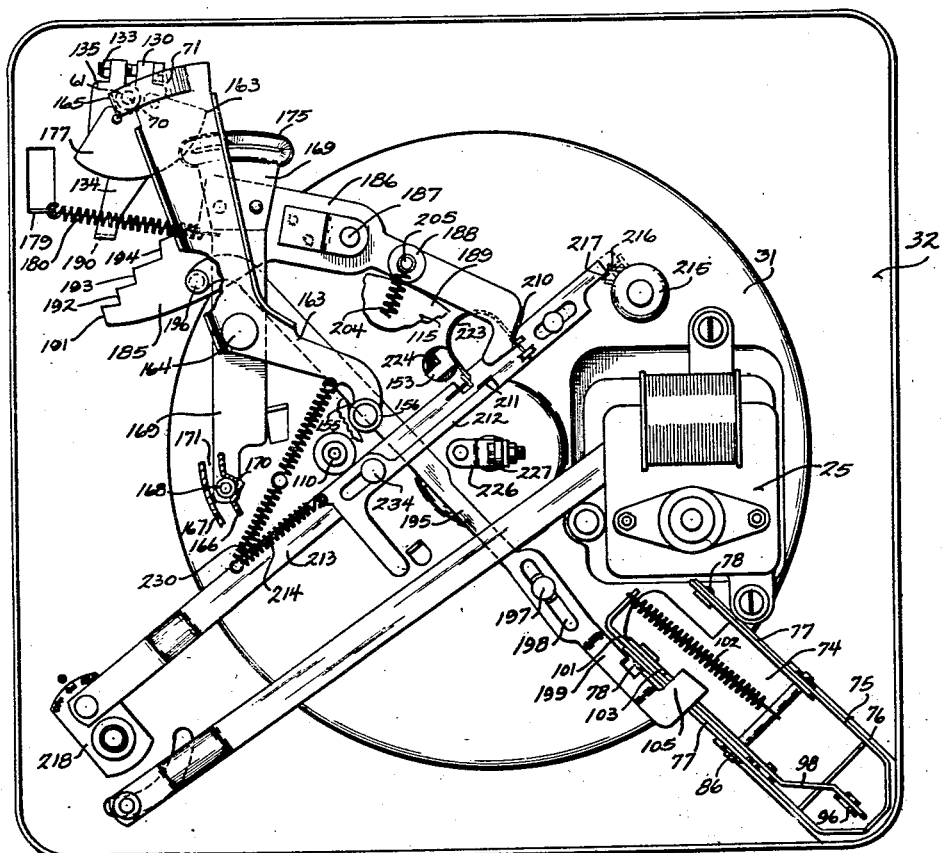
Fig. 9 is a bottom plan view of the device with the control cam largely broken away, the parts being shown in playing position.

The motor 25 has a drive shaft 26 frictionally engaging the soft rim 27 of a driving wheel 28 which also engages the inner rim 29 of turntable 30 to effect clockwise turntable rotation as viewed in Fig. 1. The partially illustrated means whereby the relative rate of turntable rotation is controlled constitutes no part of the present invention and need not be described.

The turntable 30 is disposed in a recess 31 in the bed plate 32 as best shown in Fig. 12. The hub 33 of the turntable rotates on a bushing 34 carried by a tubular post 35 fixed to the bed plate 32. The spindle 36 is positioned within the post and through it extends a vertically reciprocable push rod 37 for actuating the record escapement fully disclosed in our co-pending application. Briefly, the record 38 (Fig. 12) rests at its center on the shoulder 39 of the spindle, as well as being supported at its periphery on the shelf hereinafter to be described. In this position, the record aperture 40 is offset from the spindle. Within the aperture lies the escapement dog 41 abutting the inner margin of record 38. This dog is both vertically reciprocable and also pivotal on the cross pin 42 of the spindle, being shown in Fig. 12 at the upper limit of its movement, to which it has been impelled by the bias of the spring 43, resting on the pin.

The upper end of the actuating push rod 37 is beveled at 44 and the lower end of the dog 41 has a complementary bevel 45 so that, when the rod 37 moves upwardly, the dog 41 is displaced pivotally to move to the right, as viewed in Fig. 12, the record 38 to register its opening 40 with the spindle and permit the record to slide down the spindle toward the turntable 30. Any succeeding record, such as that shown at 46 in Fig. 12, is prevented by the detent 47 from moving laterally with record 38 and, when record 38 moves down the spindle, record 46 takes its place on the shoulder 39, the ejecting dog 41 moving into the aperture of the successive record upon retraction of the push rod 37.

For a general disclosure of the tone arm, reference is made to Figs. 1 to 6 and 24.

The tone arm 50 carries at its end a suitable playing head 51 which carries the stylus (not shown) and with which the present invention is not concerned. The arm comprises an inverted channel having intermediate its ends a bridge at 52 so formed, as best illustrated in Fig. 24, as to rest securely on the support post 53, when the player is not in operation. This protects the stylus, preventing the tone arm from falling to the base.

At its rear end, the arm 50 comprises a mounting housing 55 which is pivoted on a cross pin 56 carried by the ears 57 of the mounting bracket 58, the details of which are best shown in Figs. 4, 5 and 6. This bracket is so made with a slot at 59 and spanned by bolt 60 that it can be clamped onto the sleeve 61 which is very freely rotatable in the support 62 carried by the base plate 32. As the stylus follows the record, the arm 50 oscillates upon the axis of sleeve 61, requiring the sleeve to oscillate with it. Yet the tone arm 50 is freely movable in a vertical plane respecting the sleeve, such movement being accommodated by the pintle 56.

Also pivoted on the pintle 56 is a bracket 63 which, at the upper end of its arm 64, carries a laterally projecting finger 65 which provides an anchorage for the tension counterbalancing spring 66. The lower end of this spring has a loop engaged with one of a number of grooves at 67 in the periphery of a pin 68 carried by the mounting head 55 of the tone arm. By engaging the spring loop with one or another of the grooves 67 from a position directly beneath finger 65 to a position somewhat offset from a vertical line through said finger, the tension of the spring as exerted on the arm can be very delicately adjusted to satisfy the exact counterbalance requirement. Accordingly, as the stack of records on the turntable is small or large in height, the stylus at the end of the tone arm must necessarily operate at different levels. The change of angle of the tone arm varies the tension of the counterbalancing spring 66. However, the construction is such that the moment with which the spring 66 acts on the anchorage pin 68 varies inversely with the variation in tension so as to maintain substantially constant needle pressure regardless of how many records have been deposited on the turntable. With the tone arm in its lowest position, as in Fig. 2, the spring 66 is at maximum tension but acts substantially at minimum radius from the fulcrum 56. As the tone arm is raised, the spring tension decreases slightly but the point of spring anchorage moves slightly outwardly to a position of greater radius respecting the tone arm fulcrum.

It will be observed that inasmuch as the bracket 64 is not fixed but is pivoted on the pintle 56, its functioning as a spring anchorage depends upon its engagement with some other part. In the playing position of the tone arm, the bottom end 69 of the bracket 64 rests upon the supporting bracket 58 as shown in Fig. 3. Throughout the range of vertical movement of the tone arm during record changing and playing as hereinafter described, the tone arm will continue to be counterbalanced by the spring. However, if it is desired to lift the tone arm to the extreme position shown in Fig. 6 either to clean or replace the stylus, for example, the boss 550 in the mounting head 55 of the tone arm engages the spring anchorage finger 65 so that in the continued movement of the tone arm in an upward direction, the entire spring anchorage bracket 63 moves with the tone arm, thus maintaining the tension on the spring 66 but relieving the tone arm completely of the bias of the spring.

For the purposes of the record changing cycle hereinafter to be described, the tone arm is raised and lowered by a push rod 70 (Figs. 2 and 7), the lower end of which is engaged by the lifting cam 71 and the upper end of which engages a thrust screw 72 threaded into the boss 550 and held in any desired position of adjustment by the spring detent 73. The adjustment of the screw enables very accurate control of the precise raising and lowering movements of the tone arm for the particular purpose of depositing the stylus smoothly into contact with a record to be reproduced.

Reference has been made to the record support shelf which is bodily adjustable according to the diameter of the record to be played. It is desirable to understand the functioning of this shelf before the cycling mechanism is described. The shelf is best illustrated in Figs. 15 to 17.

Secured beneath base plate 32, and connected to the bottom of the recess portion 31 thereof, as shown in Fig. 13, is a bracket 74 to which the hollow support shelf post 75 is pivoted. This post projects upwardly through an opening 76 in the base plate. Below the base plate, the post has forwardly projecting arms 77 which extend on opposite sides of the bracket 74 and are pivotally connected thereto by pintle rivets 78 best shown in Fig. 14. The actual record shelf is provided by a lip 79 at the upper end of the adjustable support post 75. In the position shown in Fig. 13, wherein the arms 77 are substantially horizontal and the post 75 is substantially upright as it projects above the base plate 32, the extreme periphery of a twelve inch record 80 will just rest upon the supporting lip 79. If the post is lifted bodily through the aperture 76 about the pintles 78 to the position shown in Fig. 16, its lip 79 will approach the spindle 36 so that the shelf is now adapted to engage the periphery of the ten inch records 81. If the post is limited still further to the position shown in Fig. 17, the lip 79 will approach so closely to the spindle as to be adapted to engage the peripheries of the seven inch records 82.

In order to maintain the post yieldably in these several positions, the back edges of the bracket 74 are notched at different heights at 83, 84 and 85. A cross pin 86 disposed in slots 87 in the arms 77 of the record support post 75 is urged by a tension spring 102 (Fig. 3) into the notches 83, 84 or 85 of the bracket to serve as a detent for maintaining the post in any position of adjustment. It will be observed that in Fig. 13 the detent pin 86 is engaged with notch 83. In Fig. 16, it is engaged with notch 84. In Fig. 17, it is engaged with notch 85.

The various positions of the record support post 75 take account not only of the diameter of the records but also of their thickness. It will be recalled that in order for the escapement mechanism in the spindle post 36 to function properly, it is necessary for the dog 47 to retain the second and subsequent records against lateral displacement when the dog 41 is pushing the lowermost record from the spindle support shelf 39. Since the records vary in thickness, as well as in diameter, the support post is so designed that, in the course of its pivotal movement, it also changes the angular position of the record respecting the spindle to compensate for the difference in thickness by a slight change in the angle of the plane in which the record is disposed.

Thus in Fig. 13, the relatively heavy twelve inch record is set at a relatively steep angle to make sure that the dog 47 will not pass through the second record into engagement with the first. In Fig. 16, where the support post is adjusted for a ten inch record, the angle is reduced to make sure that the dog 47 will not pass through the second record into engagement with the first. In Fig. 16, where the support post is adjusted for a ten inch record, the angle is reduced to make sure that the second record will engage the dog. The seven inch record of Fig. 17 is very thin and the position of the post in this view supports the thinner records more nearly horizontal, thereby, in effect, relatively raising the inner peripheral margin of the second record to assure its contact with dog 47.

The follower 88 pivoted by means of pintle 89 to the upper end of the support post has a cushion 90 which normally rests on the uppermost record of a stack which is supported on the shelf 79. Hence the records are successively delivered down the spindle by the escapement means already described, the follower 88 pivots upon its pintle 89 to follow the record and maintains even a single record under a predetermined pressure toward the supporting shelf or lip 79.

For placing a record or a stack of records upon the lip, the follower may readily be swung out of the way as shown in Fig. 20, its tension spring 91 moving across the pintle 89 to hold the follower in its raised position. When the last record is discharged from the shelf provided by lip 79, the follower drops to the position of Fig. 19, this movement serving, through apparatus presently to be described, to initiate a sequence of operations which results ultimately in shutting off the player.

The only portion of the shutoff mechanism which is concerned with the support shelf is the linkage best shown in Figs. 13, 15 and 19. A finger 92 mounted interiorly in the follower 88 is adapted, in the final movement of the follower to the position shown in Fig. 19, to oscillate a toggle link 93 by engagement with its surface 94. This link is pivoted at its upper end on pintle 89 and has pintle connection at 95 with another toggle link 96 counterbalanced by spring 97. When the weight of the follower straightens the toggle links 93 and 96, the lever 98, with which the link 96 is pivotally connected at 99, is oscillated about its fulcrum support 100 to move its free end portion 101 away from the pintle 78 of bracket 74, upon which the lever ordinarily rests, and to lift the hook 103 with which the free end of the lever is provided. The hook coacts with an arm 105 in a manner hereinafter to be described.

The arrangement for controlling the sequence of operations involved in the record changing cycle will now be described.

As shown in Fig. 12, the mounting plate 32 carries in its recessed portion 31 a bearing member 110 within which is rotatably mounted a shaft 111. At its upper end, this shaft carries a mutilated gear 112. At its lower end, the shaft carries a multiple cam generally designated by reference character 115 and best shown in Figs. 11 and 12.

Except at 116 (Figs. 1, 21 and 23), where the mutilated gear 112 lacks teeth, the periphery of the gear has teeth at 117 which may be meshed with the teeth 118 of a driving pinion 119 formed on the hub 33 of turntable 30. The portion of the hub immediately above its pinion teeth 118 has a pocket 120 at one side and a cam 121 at its opposite side. The angular spacing between the pocket and the cam accurately predetermines the timing hereinafter described. The margin 122 adjacent pocket 120 provides a surface engaged by the dog 123 whereby motion may be communicated from the rotating hub 33 of the turntable to the gear 112 to displace the latter angularly for a sufficient distance to mesh its teeth 117 with the teeth 118 of the pinion. The margin 122 is so located above one of the teeth 118 that constant velocity of the gear is maintained at the time its teeth are meshed with those of the pinion. This can happen only when the dog 123 is shifted from the retracted position of Fig. 1 to the advanced position of Fig. 23 upon its pivotal connection at 124 with gear 112. The dog is normally biased toward its advanced position by the tension spring 125. However, it has a cam surface at 126 which, as the gear approaches the conclusion of 360° of rotation, engages the hub 33 of the turntable to retract the dog against the action of spring 125.

The dog is normally held in its retracted position by a detent lever 127 to which spring 125 is anchored so that this lever also is biased by that spring. The normal position of detent lever 127 and dog 123, except during cycling, is that shown in Fig. 1, the finger 128 of lever 127 being engaged behind the tail portion 129 of the dog to hold the dog in the position to which it has been forced by contact of its cam surface with hub 33. However, if the detent lever 127 is oscillated counterclockwise as viewed in Fig. 1 to the position in which it is shown in Fig. 21, the dog is released and springs outwardly to be engaged by the margin 122 of the pinion recess 120 whereby the clockwise rotation of the pinion as viewed in Fig. 21 will initiate counterclockwise rotation of the gear 112.

The displacement of the detent lever 127 to release the dog is effected by a velocity trip mechanism somewhat similar to that described in our co-pending application Serial No. 105,864.

Mounted below the base plate 32 on the tubular shaft 61 which carries the tone arm is a bracket 130 (Fig. 2) which is clamped on the shaft with a bolt 133 (Fig. 7) and has upper and lower arms 134 and 135. On the upper arm of this bracket is a threaded stud 136 encircled by a compression spring 137 seated at its upper end against a nut 138. Pivoted on the stud is a lever 139, one end of which is frictionally held between upper and lower washers 140 and 141 which tend to cause lever 139 to oscillate with bracket 130, tubular shaft 61 and tone arm 50. However, the frictional drive exerted on the lever 139 is very light.

The frictionally driven lever 139 projects through the slot 142 in the base plate 32 for movement with the tone arm from a starting position such as that shown in full lines in Fig. 1 to an ultimate position such as that shown in dotted lines in Fig. 1.

As the lever approaches its final position, its tip encounters the upturned finger 143 of the velocity trip lever 144 which is pivoted at 145 to the recessed portion 31 of the base plate 32. This lever has one arm 146 extending upwardly as shown in Fig. 12 and carrying a roller 147 at the level of the cam 121 on the hub of the turntable. Another arm 149 of the velocity trip lever projects laterally therefrom and has a finger 150 normally underlying the lever 151 which is pivotally mounted on the detent lever 127 by means of pintle 152 which enables lever 151 to move freely in a vertical plane subject to gravity bias.

When the lever 139, frictionally driven by the tone arm, encounters the finger 143 of the velocity trip lever 144, it tends to oscillate the velocity trip lever 144 counterclockwise from the position of Fig. 1 to the position of Fig. 21. However, each time the cam 121 on the hub of the turntable 30 strikes the cam follower roller 147 on the arm 146 of the velocity trip lever, it actuates the velocity trip lever 144 clockwise back to its original position. The range of movement of levers 139 and 144 when the tone arm is impelled by its stylus only by the normal pitch of the record groove is insufficient to allow the finger 150 of the velocity trip lever 144 to be withdrawn from beneath the catch lever 151. However, after the stylus reaches the end of the record groove and passes on to the groove of relatively higher pitch which is near the hub of the record, it is then able, between impacts of cam 121 on cam follower roller 147 to oscillate the velocity trip lever 144 sufficiently to withdraw finger 150 from beneath the catch lever 151, thus allowing the catch lever to drop across the end of finger 150 as shown in Fig. 21. Thereupon, the next impact of the cam 121 upon cam follower 147 is communicated through the velocity trip lever arms 146, 149 and finger 150 to the side face of catch lever 151 to effect the bodily oscillation of detent lever 127 from the position of Fig. 1 to that of Fig. 21, thereby releasing dog 123 to oscillate counterclockwise under bias of spring 125 into the recess 120 of the turntable hub 30 where it will be engaged by the margin 122 of such hub during continued turntable rotation. As above described, this initiates rotation of the gear 112 to a point where the teeth 117 of such gear will mesh with the gear 118 on the hub of the turntable and the continued rotation of the turntable will thereupon rotate the gear for 360°.

Nearing the conclusion of 360° of rotation of gear 112, the cam surface 126 on the dog 123 will engage the hub to re-cock the dog behind its detent finger 128 as shown in Fig. 1. Meantime the velocity trip lever 144 will also have been re-positioned by the drag of lever 151 (this being mounted on lever 127 which is carried by the gear) across another lateral finger 153 which underlies the gear as shown in Figs. 1 and 21. Thus when the lever 151 is dragged by the gear across finger 153, the trip lever 144 is swung clockwise about its pivot 145. This movement is unobstructed because, as will hereinafter be explained, the movement of the gear has retracted the tone arm and consequently has withdrawn the frictionally impelled lever 139 from the path of finger 143 on the velocity trip lever. As a result of the clockwise oscillation of the velocity trip lever, its finger 150 is re-located in the position shown in Fig. 1. In the final rotation of gear 112, the catch lever 151, depending, up to this time, in the dotted line position of Fig. 22, encounters finger 150 and rides upon to it as shown in Fig. 22. This time the frictional drag of the catch lever 151 is exerted straight in the direction of the pivot 145 upon which the velocity trip lever 144 oscillates. Consequently, there is no moment tending to oscillate the velocity trip lever when the catch lever 151 rides on to finger 150.

The 360° rotation of the gear 112 which is initiated by the velocity trip lever and is terminated when the toothless portion 116 of the gear frees the gear from driving engagement with the pinion, has the following effect on the cycling of the device.

The multiple cam 115, best shown in Figs. 11 and 12 and connected by shaft 111 with gear 112 to partake of the 360° rotation thereof comprises an eccentric cam flange 155 for raising the tone arm. With the gear at rest in the position shown in Fig. 1 and Fig. 11, the cam follower roller 156 lies in a pocket 157 of the cam flange 155 in a position which is slightly more distant radially from the axis of shaft 111 than the concentric portion 158 of such flange. From the pocket 157, the radius of flange 155 increases sharply at 159 to the level of the concentric arcuate portion 160, which may be of constant radius for almost 180°. Thence the radius decreases at 161 to the minimum radius provided by the concentrically arcuate dwell surface at 158.

The cam follower roller 156 which is engaged successively by the cam surfaces above described is mounted on the lever 163 which is pivoted at 164 and carries at its free end the lifting cam surface 71 described in connection with Fig. 7. The oscillation of lever 163 produced by the rapid ascent of cam follower roller 156 on surface 159 of cam 155 causes the lifting cam surface 71 at the free end of the lever to move from right to left as viewed in Fig. 7, thereby raising the push rod 70 into engagement with set screw 72 on the under side of the tone arm to effect the raising of the tone arm to lift the stylus from the record.

Through mechanism presently to be described, the tone arm is swung aside to permit a fresh record to drop down the spindle into playing position, following which the tone arm swings back toward playing position, that position being determined in a manner hereinafter set forth. Throughout the swinging movement of the tone arm in its retracted position, and back to playing position, the cam follower roller 156 remains on the elevated portion 160 of cam 155. After the tone arm has been swung back to playing position, the cam follower roller 156 descends the cam surface 161 to lower the tone arm toward the record, this movement being gradual so that the stylus will engage the record groove with little impact. However, the lowering movement continues beyond the point of record engagement by the stylus and causes a brake shoe 165 at the free end of the lever to engage the lower end of the tubular rock shaft 61 with which the tone arm is connected as above described. The braking position of the shoe 165 is indicated by dotted lines in Fig. 7. The friction between the brake shoe and the rock shaft steadies the stylus in its proper position until the rest of the movable parts resume their retracted positions. The braking operation continues only for such period as is required for the portion 158 of the cam face 155 to pass beneath the follower roller 156. As the cam comes to rest, the roller engages the slightly inclined portion 157 of the cam flange, which oscillates the lifting lever 163 just far enough to retract the shoe 165 from engagement with the tubular rock shaft 61 but without reengaging the push rod 70 with the adjustable set screw 72. So far as the lifting lever is concerned, the cycle is now complete and the playing of the new record is continuing.

There is an inherent tendency of tone arms in most movable record changers to "skate" toward the center of the record when the stylus chances to land on the outer edge of the record where no lead-in spiral groove exists. While there is some friction in the rock shaft, the friction at this point should be kept low so that the stylus may follow the record groove without undue wear. The brake shoe 165 provides just enough additional frictional resistance to hold the tone arm steady and prevent it from developing momentum which would lead it to skate across the record grooves. Yet, when the playing position is reached, there is no resistance to the freedom of movement of the tone arm into and along the playing groove of the record. The brake is retracted from its dotted line position of Fig. 7 to its full line position in that view only after the stylus is on the record and has had an opportunity to reach the playing groove.

The swinging of the tone arm to its retracted position and back to playing position is controlled by a pair of spaced flanges 166 and 167 between which there is confined the roller 168 carried by the tone arm swinging lever 169. When the gear is at rest, as in the position of the parts shown in Fig. 11, the cam follower roller 168 lies in an angle 170 of flange 166. The engagement of the follower roller in this angle constitutes a detent means which aids in arresting the rotation of the gear and the multiple cam at precisely the desired point. When rotation of the gear commences, and the multiple cam is turned counterclockwise as viewed in Fig. 11, the roller 168 is forced out of the angle 170 into the cam track portion 171, wherein it rapidly approaches the axis of shaft 111. This movement is communicated to swinging lever 169, which oscillates upon the pintle pin 164, this being the same pintle upon which the lifting lever 163 is pivoted. At its free end, this lever carries a pair of laterally arcuate spring fingers 175 and 176 shown in Figs. 2 and 8 to 10. These are in frictional engagement with a segment plate 177 carried by the lower arm 135 of the bracket 130 which is clamped to the lower end of the tubular rock shaft 61 upon which the tone arm is mounted. The counterclockwise oscillation of the lever 169 from the position in which it is shown in Fig. 9 impositively oscillates the segment 177 of the rock shaft 61 and the tone arm 50 in a clockwise direction as viewed in Fig. 9. However, since Fig. 9 shows the parts inverted, the direction of oscillation viewed in Fig. 1 is counterclockwise to the dotted line position in which the tone arm 50 is shown in Fig. 1. In this position of the parts, the extended upper end 134 of bracket 130 strikes a fixed stop 179, which may also serve as an anchorage for the spring 180 hereinafter referred to.

From the minimum radius point 181 of the cam track 171, the cam track rises abruptly to the point 182 and thence less abruptly to the point 183 and thence more abruptly again to 184, where there is a dwell until the angle 170 is encountered by the cam roller 168. In traversing these portions of the groove from 181 to 182, the roller 168 will cause the tone arm swing lever 169 to oscillate the tone arm fairly sharply from its dotted line position of Fig. 1 to its full line position in that view or until it encounters the arresting action of the step cam soon to be described. (See Fig. 11 and Fig. 18.) From such contact until the cam follower roller 168 reaches the point 183 in its groove, the tone arm is held still with its stop cam 134 against the selected step during the lowering of the stylus onto the record. The continued movement of the roller from 183 to 184 in the groove will completely retract the clutch leaves 175, 176 from engagement with segment 177 so that, during the record playing operation, the segment and the tone arm with which it is connected can move with entire freedom, subject only to the engagement of the stylus in the record groove.

It is the step cam that determines where the swinging movement of the tone arm will stop. The reason why this swinging movement from the tone arm is effected frictionally by the engagement of fingers 175 and 176 with segment 177 is to enable the swing lever 169 to continue throughout its range of movement despite the fact that the segment connected with the tone arm has been arrested by the step cam. It also minimizes the possibility of damage in the event of interference, manual or otherwise, with tone arm swinging movement.

The step cam 185 (Figs. 9, 10, 18 and 2) is a free-end part of a lever 186 pivoted at 187 and carrying a cam follower roller 188 engaged by a cam 189 on the outer periphery of the movable cam assembly 115. The step cam comprises a series of stop surfaces to arrest tone arm movement at any desired radial position of the stylus, according to the setting of lever 186. It will be recalled that the upper arm 134 of the clamp 130 which is connected with rock shaft 61 on which the tone arm 50 is mounted projects horizontally from the rock shaft as shown in Fig. 2. At its extremity, it carries an upstanding finger 190. By the tone arm swinging lever and the cam just described above, the tone arm is swung completely out of registry with the record to engage the arm 134 with a stop 179. It is then swung back through the frictional drive of the fingers 175 and 176 in engagement with the segment 177. As it swings inwardly, the finger 190 may, in one position of the step cam lever 186, engage the transverse margin 191 at the end of the step cam 185. If this surface is in the path of swinging movement of finger 190, the swinging movement of the tone arm will be arrested when the tone arm lies directly over the post 53 upon which it is supported when the layer is at rest. A shoulder 192 provides a stop surface engaged by finger 190 in another position of lever 186. This is the position required of the tone arm when a twelve inch record is to be played. Another shoulder at 193, if disposed in the path of finger 190, will arrest the swinging movement of the tone arm in the position which the tone arm must occupy to initiate the playing of a ten inch record. Finally, there is a shoulder at 194 which, in a fourth position of the step cam lever 186, will be engaged by finger 190 to arrest the inward movement of the tone arm in the position which it must occupy to play a seven inch record. It will be apparent that records of any size may be played by simply arresting the inward swinging movement of the tone arm by providing a shoulder at the proper radius and moving the lever 186 to make such shoulder effective in the path of the finger 190 connected with the tone arm.

While the cam follower roller 188 adjusts the step cam lever 186 in each cycle, the actual stop position of the step cam lever is not determined by the cam but by the link 195 which is pivoted to the step cam lever at 196 and is guided upon a pin 197 for which the link has a slot at 198 (Fig. 9). Beyond the guide pin 197, link 195 is sharply offset downwardly at 199 (Figs. 13, 16, 17) and has a finger 105 referred to above in connection with the description of the adjustable record support shelf. In Fig. 13, where the support shelf is adjusted for the playing of a twelve inch record, the arm 101 engages the finger 105 in the position shown in full lines. When the step cam lever 186 and its controlling link 195 advance from the fully retracted position in which these parts are illustrated in Fig. 9, the finger 105 will engage the hook 103 at such a point as to stop further clockwise oscillation of the step cam lever 186 in a position where the shoulder 192 will lie in the path of finger 190, thus determining the proper location at which the tone arm should descend to the twelve inch record.

If the finger 101 and hook 103 are disposed as shown in Fig. 16 to support a ten inch record, the link 195 will engage the finger sooner than in Fig. 13 so as to arrest the clockwise oscillation of lever 186 at a point where shoulder 193 will register with finger 190, thus positioning the tone arm above the starting point of the ten inch record groove. Similarly, the adjustment of the record support shelf to the position of Fig. 17 for the support of the seven inch record will limit the advancing movement of link 195 and step cam lever 186 to a position where shoulder 194 will lie in the path of finger 190, thus determining the proper tone arm position for initiating the playing of the seven inch record.

The cam 189 rises sharply at 201, dwells at the radius indicated at 202 for the greater part of its extent and descends gradually to a termination point at 203. As the composite cam 115 is rotated, the engagement of the cam surface 201 with the follower roller 188 oscillates the step cam lever 186 clockwise as viewed in Fig. 11, or counterclockwise in the inverted view, Fig. 9. This completely retracts the step cam from the path of finger 190, leaving the tone arm free for unrestricted rotation. The converse movement of the step cam lever is produced solely by the tension spring 204 which is connected to the stud 205 on which the follower roller 188 is journaled. The other anchorage of the spring is provided by a post 206 fixed to the under side of cam 115 in a position slightly offset radially from its center as shown in Figs. 2 and 11 and 18. As the cam rotates, the tension of spring 204 is varied as needed, being reduced to a minimum when the parts are at rest, as shown in Fig. 2 and Fig. 11, and being increased when the cam is in rotation so that the step cam lever 186 will be urged strongly toward the limit of movement permitted it by link 195 to assure proper operation of these parts. Consequently, the step cam lever 186 is moved positively out of the path of finger 190 and returned toward such path to the extent permitted by the link 195. This, in turn, is determined by the adjustment of the record support shelf.

When the last record drops from the shelf as is shown in Fig. 19, the strength of the spring 91 which acts on the follower 88 is sufficiently great to straighten out the toggle links 93 and 96 against the tension of spring 97. Thereupon the finger 101 and hook 103 are no longer dependent for their position entirely upon the pivotal adjustment of the support 75. The hook 103 would be completely retracted from the path of finger 105 but for the fact that these two parts interlock in the manner shown in Fig. 19 to preclude such retraction. This is intended to permit the completion of the playing of the last record. Not until the velocity trip is actuated at the conclusion of that operation will the composite cam be set in operation again to withdraw the step cam lever 186 to its retracted position. As soon as the step cam lever is retracted to the position shown in Fig. 9, the hook 103 will be released from finger 105 and will be pulled upwardly out of the path of such finger by the final straightening of the toggle links 93, 96 under the downward thrust of follower 88. When the follower roller 188 of the step cam lever then passes off of cam 189, there will be nothing but the length of slot 198 to restrain the inward movement of link 195 and the advance of lever 186 clockwise as viewed in Fig. 9, with the result that the surface 191 will now be positioned in the path of finger 190 on arm 134 to hold the tone arm in its inactive position over the rest post 53.

It will be observed from Fig. 11, which shows the parts in their playing position, that after each spring biased advance of the step cam lever 186 to its various stop positions, the lever is always retracted again when the roller 188 rides up on to surface 201 and thence to surface 202 of cam 189. This completely withdraws the step cam from the path of finger 190 of the tone arm rock shaft when the tone arm is playing, or when it is at rest.

The fact that the retractive movement of the step cam lever 186 is effected positively by engagement of cam 189 with cam follower roller 188 is utilized for shutting off the device after the last record is played. It will be recalled that the advancing movement of lever 186 is effected by the bias of spring 204 to an extent determined during the playing of a sequence of records by the position of the record support shelf and, after the playing of the last record, by the straightening of the toggle links 93, 96 under the thrust of the follower 88, whereby the hook 103 is completely retracted out of the path of link 195.

Figure 10:
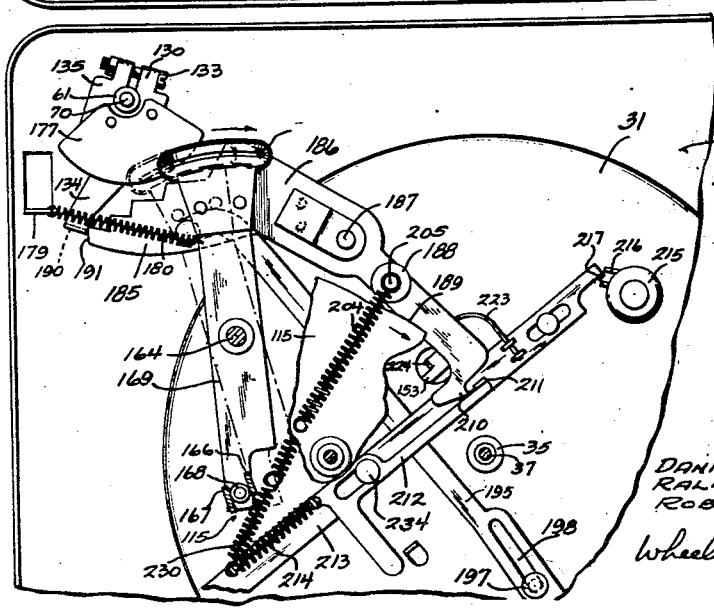
Fig. 10 is a view similar to Fig. 9 fragmentarily illustrating some of the parts as they appear in the rest position.

When the hook 103 is completely withdrawn, and the link 195 advances farther than normal, the step cam lever 186 oscillates farther than normal in a clockwise direction as viewed in Fig. 9, thereby reaching the position of Fig. 10. At the end of this lever opposite the step cam 185, there is a finger 210 which, during the playing of a stack of records, is never retracted back far enough to clear the upstanding lug 211 on a sub-slide 212 which is reciprocable longitudinally of a main control slide 213. The sub-slide is normally retracted by a spring 214 as shown in Fig. 9.

Not only does sub-slide 212 reciprocate on the control of slide 213 but it may also oscillate upon its guide pin 234 to function as an escapement during automatic shut off.

Following the playing of the last record, and the subsequent unusual extent of advance of lever 186, its finger 210 engages lug 211 to displace the sub-slide 212 angularly, thereby enabling finger 210 to pass behind the lug 211, whereupon the sub-slide 212 is pulled back into alignment by its tension spring 214 with the finger 210 behind lug 211, as shown in Fig. 10, with the result that the next engagement of cam 189 with the follower roller 188 draws the sub-slide 212 to the right as viewed in Fig. 10 and finally advances the main slide 213 to the right, thereby shutting off the snap action switch 215, the forked actuator 216 of which is engaged by a prong 217 at the end of the main control slide 213.

The switch may also be shut off manually at any time by oscillation of the control 218 (Fig. 1) to register its symbol "Off" 219 with the indicating dot 220 on the base. As shown, the symbol "On" 221 is registered with the dot to indicate that the slide has been withdrawn to the left as viewed in Fig. 9 (to the right as viewed in Fig. 1) to turn the switch on. Corresponding symbols have been incorporated in Fig. 9 for convenience, although these are not actually used upon the under side of the base in actual practice.

If the control 218 is oscillated to the position marked "Rej." (Reject) as shown at 222 in Fig. 1, the cycling of the cam mechanism is initiated by the engagement of a spring loop 223 (Figs. 9 and 10) which is carried by slide 213, with a finger 224 which projects through the base from the velocity trip lever 144. It will be recalled that any oscillation of the velocity trip lever more abrupt than that occasioned by the normal pitch of the record groove will release the dog 123 to initiate a changing cycle. The arrangement just described enables this to be done manually. The spring 223 is sufficiently yieldable to accommodate any shock that might otherwise be occasioned if the lug 121 engaged the roller 147 of velocity trip lever 146 at a time when the control was being held manually in the "Rej." position.

While the cycling of the tone arm and associated parts has been fully described above, reference has not yet been made to the operation of the escapement mechanism which discharges successive records into playing position in the course of such cycle. This is done by the cam surface 225 of the composite cam 115 as shown in Figs. 11 and 12. The push rod 37 already described above as a means of operating the record escapement carries at its lower end a bracket 226 for the cam follower roller 227. The cam rises again at 228 (Fig. 11) and reaches its peak at 229, descending thence gradually to the level at which the roller is shown in Fig. 12. It will be observed that the feed of the next successive record into playing position occurs after the tone arm has been raised and swung laterally to its retracted position, and before it returns to a new position determined by the step cam.

While it is believed that the cycling of the device will have been made clear by the detailed description of the parts, the operation may be summarized as follows:

With the record support shelf adjusted in accordance with the diameter of the records to be played, and the follower 88 raised as shown in Fig. 20 to receive the record stack, any suitable number of records is placed upon the spindle as shown in Figs. 12 and 13.

The control 218 is now moved from its "Off" position (in which the symbol 219 registers with the indicator dot 220) to its "Rej." position (in which its symbol 222 registers with the dot 220). It will not remain in this position but is returned by spring 230 which becomes tensioned when the slide is moved to the left beyond the position in which it appears in Fig. 9. Consequently, as soon as the control is released from manipulation by the operator, the spring will return the slide to the position of Fig. 9 in which the switch is on, but the spring 223 is disengaged from finger 224 of the velocity trip lever.

The engagement of the spring with the finger of the velocity trip lever oscillates the lever to a position shown in Fig. 21 and, the switch being on and the turntable in operation, the cam 121 will shortly engage roller 147 to oscillate lever 144 against the now fallen catch lever 11, thus displacing the detent 127 to release dog 123. The dog is promptly engaged by the edge 122 of the turntable hub 33 to mesh the teeth 117 of gear 112 and teeth 118 of the portion 119 of the hub. This initiates rotation of the composite cam.

The first thing that happens is the elevation of the tone arm from the post upon which it is at rest as shown in Fig. 2, this being done by cam 155 acting on roller 156 to oscillate the raising lever 163. The cam 71 engages post 70 which thrusts upwardly on set screw 72 to lift the tone arm.

The tone arm swinging means immediately becomes effective but the tone arm is already retracted almost as far as it is capable of swinging. However, whether the tone arm is already retracted, or whether it is in a position to which it has been advanced by the playing of a record, in any case the cam follower roller 168 is acted upon by the cam flanges 166 and 167 to oscillate the lever 169 whereby to move the friction driving fingers 175, 176 into engagement with segment 177. Assuming that the tone arm is already retracted, as shown in Figs. 1 and 9, the fingers 175 and 176 will simply slip on the surface of the segment plate 177. Had the tone arm been advanced, the frictional drive resulting from engagement of the fingers with the segment plate would have brought about a swinging retractive movement of the tone arm to the right, as viewed in Fig. 1.

Meantime the cam follower roller 227 of the record ejecting push rod will have been traversing cam surface 225 and, on engagement with the rise 228 therein the escapement mechanism will begin to act to drop a record on to the turntable.

As soon as the record is dropped, the tone arm swinging cam follower 168 will reach that portion of its channel 171 which will cause a reverse or clockwise oscillation of lever 169 as viewed in Fig. 9, with the result that the tone arm will now start moving out over the newly deposited record. In its path will be the appropriate shoulder of the step cam 185 which is advanced by the tension of its spring 204 from the retracted position in which it is held by engagement of its follower roller 188 with the cam surface 202 of the composite cam 115. As aforesaid, the position of the step cam to bring the appropriate shoulder into play, is determined by the adjustment of the record shelf support for the diameter of record which is being handled.

The lever 163 which has lifted the tone arm, will now have lowered the tone arm and applied the brake shoe 165 to the tone arm rock shaft 61 to hold the tone arm frictionally until the playing of the newly dropped record commences.

The cycling is the same when each record is completed.

However, when the last record drops from the shelf 79, the follower 88 falls to the position shown in dotted lines in Fig. 13, its weight tending to straighten out the toggle links 93 and 96 in the tubular post 75, and thereby to lift the hook 103 of arm 101 out of the path of finger 105 of the link 195 connected with the step cam.

The engagement of the hook with finger 105 precludes movement of the arm 101 out of the path of the link until the newly dropped record has been played. When the cycling operation then proceeds, the step cam lever 186 swings counterclockwise to the position shown in Fig. 9 where it is free of the hook 103, leaving the hook 103 unobstructed to complete its retractive movement under the weight of the follower 88. When the step cam then returns in a clockwise direction as viewed in Fig. 9, it will move to the position of Fig. 10 so that the shoulder 191 will lie in the path of finger 190. This will hold the tone arm in its fully retracted position. At the same time, the shoulder 210 at the free end of the step cam lever will have moved behind the finger 211 of sub-slide 212 so that the subsequent retractive movement of the step cam will now actuate the sub-slide 212 and the main slide 213 to shut off the switch 215, thus leaving the parts at rest.

We claim:

1. In a record player having a record feed escapement, a turntable to which the records are delivered by said escapement for playing, and a tone arm having lifting and swinging means, the said escapement and lifting and swinging means requiring operation in each record changing cycle, the combination with said turntable and a driving motor therefor of a hub provided with a pinion and a shoulder, a mutilated gear having teeth adapted to mesh with those of the pinion and having a peripheral portion free of such teeth, whereby said gear is normally at rest, a dog mounted on said gear and movable to project from said peripheral portion into the path of said shoulder to receive motion from said hub in a direction to mesh the teeth of the gear with those of the pinion, means for effecting the projection of said dog from said gear into the path of the shoulder, and means connected with the gear for actuating the escapement and the tone arm lifting and swinging means in the course of a cycle of gear rotation, said means for effecting the projection of the dog comprises a spring biasing said dog for projecting movement, a detent normally engaged with said dog to preclude such movement, a trip lever having a substantially horizontal pivot on the detent on which said lever is gravity biased for vertical movement, a control lever having a finger normally engaged beneath the trip lever to normally support said lever against its gravity bias, said control lever being provided with a cam follower in proximity to said hub, a cam on the hub adapted to oscillate the control lever and normally to maintain its finger beneath the trip lever, means frictionally driven from the tone arm for operating the control lever in a direction to move its cam follower toward said hub and to retract its finger from beneath the trip lever, the control lever being restored following each normal advance by engagement of the cam with the cam follower, an abnormal advance of the tone arm being adapted to retract said finger from beneath the trip lever before the control lever can be restored by said cam, whereby said trip lever will fall by gravity across the end of said control lever, the next engagement of the cam with the cam follower transmitting motion from said control lever finger to the side of the trip lever in a direction to actuate said detent to release said dog.

2. The device of claim 1 in which the control lever has a projecting arm in the path of the trip lever during gear rotation to reset the control lever finger in a position where the trip lever will ride onto it at the conclusion of the gear cycle.

3. The device of claim 2 in which said dog is pivoted on the gear and has its biasing spring connected to said detent, the dog having a portion engageable with said hub during gear rotation to force said dog into its retracted position to re-engage the detent therewith.

4. In a record player, the sub-combination which comprises a driving motor having a shut-off switch, a part operatively connected with said switch for the actuation thereof, a step cam lever movable respecting said part between a retracted position and various advanced positions, said lever and part having means interlocked only in the most advanced position of said lever and in a direction such that the movement of said lever toward its retracted position will actuate said part to shut off the switch, a swingable tone arm having a connected stop arm into the path of which successive steps of the step cam are movable in the successive advanced position of the step cam, a spring biasing the step cam in a direction toward its most advanced position, a detent selectively adjustable to control the extent of step cam lever advance, an adjustable record supporting post movable to accommodate different diameters of records and connected with said detent whereby the movement of said post to accommodate a record of a given size will shift the detent to limit the spring biased advance of the step cam to dispose a suitable step thereof in the path of the stop arm to properly position the tone arm for the record size to which the post is adjusted, and a record follower carried by the post and biased into engagement with a record supported thereon, said post having motion transmitting connections engaged by the follower upon the discharge of such record from the post to act upon the detent in a direction to retract it whereby to permit the step cam lever, in the next operation thereof, to move to its extreme advanced position for interlocking engagement with said part, said interlock comprising means whereby the subsequent retractive movement of the step cam lever will shut off the switch.

References Cited in the file of this patent

UNITED STATES PATENTS

| | | |
|---|---|---|
| 1,303,900 | Horn | May 20, 1919 |
| 2,235,693 | Wells | Mar. 18, 1941 |
| 2,251,381 | Wright | Aug. 5, 1941 |
| 2,271,001 | Fortune | Jan. 27, 1942 |
| 2,284,305 | Slade | May 26, 1942 |

(Other references on following page)

UNITED STATES PATENTS

| | | |
|---|---|---|
| 2,295,092 | Offen | Sept. 8, 1942 |
| 2,298,988 | Todd | Oct. 13, 1942 |
| 2,328,641 | Glaser | Sept. 7, 1943 |
| 2,330,293 | Knox | Sept. 28, 1943 |
| 2,352,331 | Leline | June 27, 1944 |
| 2,436,529 | Pressley | Feb. 24, 1948 |
| 2,453,123 | Erwood | Nov. 9, 1948 |
| 2,506,555 | Wennerbo | May 2, 1950 |
| 2,519,579 | Johnson | Aug. 22, 1950 |
| 2,545,363 | Kenney | Mar. 13, 1951 |
| 2,545,643 | Bender | Mar. 20, 1951 |
| 2,551,506 | Rockwell | May 1, 1951 |
| 2,568,496 | Hall | Sept. 18, 1951 |
| 2,576,125 | Lapish | Nov. 27, 1951 |
| 2,583,845 | Holik | Jan. 29, 1952 |
| 2,591,796 | Erwood | Apr. 8, 1952 |
| 2,621,932 | Knox | Dec. 16, 1952 |
| 2,640,705 | Mortimer | June 2, 1953 |
| 2,652,258 | Dale et al. | Sept. 15, 1953 |
| 2,661,216 | Mills et al. | Dec. 1, 1953 |

FOREIGN PATENTS

| | | |
|---|---|---|
| 406,354 | Great Britain | Feb. 26, 1934 |
| 459,155 | Great Britain | Jan. 4, 1937 |